(12) United States Patent
Lundkvist et al.

(10) Patent No.: US 12,551,824 B2
(45) Date of Patent: Feb. 17, 2026

(54) FRACTION COLLECTOR, COOLING ARANGEMENT, AND RACK FOR USE THEREWITH

(71) Applicant: CYTIVA SWEDEN AB, Uppsala (SE)

(72) Inventors: Mats Lundkvist, Uppsala (SE); Tomas Yngve Agren, Uppsala (SE); Erik Nilsson, Uppsala (SE); Sebastian Skoglund, Uppsala (SE)

(73) Assignee: Cytiva Sweden AB, Uppsala (SE)

( * ) Notice: Subject to any disclaimer, the term of this patent is extended or adjusted under 35 U.S.C. 154(b) by 517 days.

(21) Appl. No.: 17/997,874

(22) PCT Filed: Jun. 21, 2021

(86) PCT No.: PCT/EP2021/066805
§ 371 (c)(1),
(2) Date: Nov. 3, 2022

(87) PCT Pub. No.: WO2021/259850
PCT Pub. Date: Dec. 30, 2021

(65) Prior Publication Data
US 2023/0347262 A1    Nov. 2, 2023

(30) Foreign Application Priority Data
Jun. 24, 2020   (GB) ...................................... 2009615

(51) Int. Cl.
*B01D 15/24*    (2006.01)
(52) U.S. Cl.
CPC .................................. *B01D 15/247* (2013.01)
(58) Field of Classification Search
None
See application file for complete search history.

(56) References Cited

U.S. PATENT DOCUMENTS

| 3,168,124 A | 2/1965 | Lenkey |
| 3,205,921 A | 9/1965 | Packard et al. |

(Continued)

FOREIGN PATENT DOCUMENTS

| CN | 2938091 Y | 8/2006 |
| CN | 203990708 U | 12/2014 |

(Continued)

OTHER PUBLICATIONS

PCT International Search Report and Written Opinion for PCT/EP2021/066805, mailed Oct. 28, 2021 (11 pages).

(Continued)

*Primary Examiner* — Hayden Brewster
(74) *Attorney, Agent, or Firm* — Eversheds-Sutherland (US) LLP

(57) ABSTRACT

The invention relates to a fraction collector apparatus (100) comprising: a support system (1, 2), a carrier (42) moveably supported by the support system (1, 2), an extension arm (3) connected to the carrier (42), at least one dispensing head (31) for dispensing droplets and moveably connected to the extension arm (3), wherein the dispensing head (31) and (carrier 42) are configured to move relative to the support system in a first plane, a tray area (11) designed to support at least one rack (6, 7), wherein the at least one rack (6, 7) is designed to hold at least one collection vessel (12, 14), wherein motion of said carrier (42) is achieved by a linear bearing Y-slide unit (41) wherein the linear bearing Y-slide unit (41) is arranged underneath a linear bearing Y-rail (40) and wherein the carrier (42) is attached to the linear bearing Y-slide unit (41).

19 Claims, 9 Drawing Sheets

(56) References Cited

U.S. PATENT DOCUMENTS

| | | | |
|---|---|---|---|
| 3,265,100 | A | 8/1966 | Holm et al. |
| 3,268,117 | A | 8/1966 | Lenkey et al. |
| 4,166,483 | A | 9/1979 | Nordlund |
| 4,422,151 | A | 12/1983 | Gilson |
| 8,114,281 | B2 | 2/2012 | Roenneburg et al. |
| 2010/0261595 | A1* | 10/2010 | Schaefer .................. B25J 11/00 494/20 |
| 2012/0079896 | A1* | 4/2012 | Frojdh ............... G01N 35/1016 73/864.21 |
| 2014/0216059 | A1 | 8/2014 | Moore et al. |
| 2016/0146654 | A1 | 5/2016 | Elia et al. |

FOREIGN PATENT DOCUMENTS

| | | |
|---|---|---|
| CN | 207607851 U | 7/2018 |
| CN | 208526697 U | 2/2019 |
| CN | 209142694 U | 7/2019 |
| GB | 1064575 A | 4/1967 |
| GB | 1164553 A | 9/1969 |
| JP | 75062 U | 1/1995 |
| JP | H04138357 A | 5/1995 |
| JP | H107140127 A | 6/1995 |
| JP | 2004100961 A | 4/2004 |
| JP | 2005221008 A | 8/2005 |
| JP | 2008125285 A | 5/2008 |
| JP | 2012529649 A | 11/2012 |
| JP | 2013205090 A | 7/2013 |
| JP | 2015081827 A | 4/2015 |
| JP | 2017516098 A | 6/2017 |
| JP | 3215663 U | 3/2018 |
| SU | 987449 A1 | 1/1983 |
| WO | 2010144036 A1 | 12/2010 |
| WO | 2015173062 A1 | 11/2015 |

OTHER PUBLICATIONS

GB Search Report for GB2009615.2, mailed Dec. 21, 2020 (6 pages).

GB Search Report for GB2009615.2, mailed Mar. 9, 2021 (4 pages).

Uhlenberg, Jan, et al., "Development of a High-Performance and Low-Cost Fraction Collector", Jan. 1, 2019, Retrieved from the Internet: URL:https://cps.unileoben.ac.at/wp/theses/Uhlenberg_BscProject2019.pdf.

Non-Final Office Action, Corresponding to Japanese Patent Application No. 2022-580222 dated Apr. 30, 2025.

Office Action and Search Report, Corresponding to Chinese Patent No. 202180044893.8 dated Apr. 4, 2025.

OILES sliding linear guide May 13, 2018 https://www.oiles.co.jp/assets/slg-guide.pdf.

Office Action, Corresponding to European Patent Application No. 25181878.7 dated Nov. 10, 2025, 4 pages.

* cited by examiner

FRACTION COLLECTOR, COOLING ARANGEMENT, AND RACK FOR USE THEREWITH

CROSS REFERENCE TO RELATED APPLICATIONS

This application claims the priority benefit of PCT/EP2021/066805, filed Jun. 21, 2021, which claims the priority benefit to GB Application No. 2009615.2, filed Jun. 24, 2020, the entire contents of which are incorporated herein by reference.

TECHNICAL FIELD OF THE INVENTION

The present invention relates in general to the field of column chromatography and in particular to a fraction collector and a method for operating a fraction collector, a cooling means configured to be used in such a fraction collector, a rack configured to be used in a fraction collector and a dispensing head configured to be used in a fraction collector.

BACKGROUND OF THE INVENTION

Chromatography is a chemical process for identifying and quantifying components held in a sample of solution. In the process, the components in the solution are separated from each other as the solution moves through a stationary material held in a column. The solution may be pumped under pressure through the stationary material in the column by one or several chromatography pumps. Fractions of the components may be collected in a series of individual containers by means of a fraction collector apparatus. In some cases, the fractions collected in the individual containers/fraction tubes/collections vessels are brought by the fraction collector apparatus and dispensed for further analysis.

A fraction collector apparatus used for receiving fluid from a fractionating column and separating the fractions of the fluid into containers is known. A nozzle for dispensing the fractions into receptacles may be arranged on an arm which may be movable in two dimensions. Electrical motors may move the nozzle in a first and second direction, which directions may be perpendicular to each other.

Known fraction collector apparatuses may however be relatively complex and expensive. Also, the known apparatuses have dimensions which needs a considerable space (footprint).

U.S. Pat. No. 8,114,281 discloses a known fraction collector apparatus having at least the problems of being complex and requiring a considerable space.

OBJECT OF THE INVENTION

The present invention aims at obviating the aforementioned problem. A primary object of the present invention is to provide an improved fraction collector which is simple, inexpensive and requires less space than known fraction collectors in the art.

SUMMARY OF THE INVENTION

According to the invention at least the primary object is addressed by means of the apparatus having the features defined in the independent claims.

Preferred embodiments of the present invention are further defined in the dependent claims.

According to a first aspect of the present invention there is provided a fraction collector apparatus comprising: a support system, a carrier moveably supported by the support system, an extension arm connected to the carrier, at least one dispensing head for dispensing droplets and moveably connected to the extension arm, wherein the dispensing head and carrier are configured to move relative to the support system in a first plane, a tray area designed to support at least one rack, wherein the at least one rack is designed to comprise at least one collection vessel, characterized in that that a motion of said carrier is achieved by a linear bearing Y-slide unit, wherein the linear bearing Y-slide unit is arranged underneath a linear bearing Y-rail and wherein the carrier is attached to the linear bearing Y-slide unit.

An advantage of this is that the fraction collector is more compact than prior art fraction collectors. Another advantage of this embodiment is that it is less complex than prior art fraction collectors, and therefore is more reliable and/or easy to sterilise/clean etc.

In various example embodiments of the present invention said linear bearing Y-rail is arranged at a position in a Z-direction that is lower than a top surface of said at least one rack arranged on said tray area. For example, the Z-direction may be parallel to an axis that is substantially perpendicular to the floor or support surface on which the fraction collector is supported in use. A lower position would thus be considered as being closer to the floor or support surface than a further distant position along this axis. X- and Y-directions may thus generally follow orthogonal axes within a plane that is generally parallel to the floor or support surface (e.g. said first plane).

An advantage of these embodiments is that the fraction collector may be made very compact.

In various example embodiments of the present invention said rack may comprise cooling means comprising an enclosed cooling volume comprising a cooling media, wherein said cooling means is configured for at least partially surrounding at least one collection vessel.

An advantage of these embodiments is that there is no need for the fraction collector to be operated in a climate-controlled environment which will enhance the usability of the fraction collector. Here the operator just needs to provide said cooling means in a freezer before use and use said cooled down cooling means when fractionation begins. The fraction collector may be operated at normal room temperature without risking a destruction of the fractionated liquid in said collection vessels.

In various example embodiments according to the present invention said dispensing head comprises a transmitter and a receiver for detecting droplets, wherein a communication path between said transmitter and receiver is crossing a path of said droplets.

An advantage of these embodiments is that droplet splash may be minimized as the movement of said dispensing head may be performed when one knows the droplets will not be released from said dispensing head.

In various example embodiment of the present invention an aperture is provided in front of the receiver.

An advantage of these embodiments is that the accuracy of detecting a droplet event may be increased.

In various example embodiments of the present invention said transmitter is an electromagnetic radiation source and said receiver is an electromagnetic radiation sensitive sensor.

An advantage of these embodiments is that various types of electromagnetic radiation sources and corresponding detectors may be used, for instance a normal white light source and a sensor for detecting white light.

In various example embodiments of the present invention, said dispensing head further comprises a tube, which tube is wider than the droplets and is made of a material which is permeable to electromagnetic radiation, said droplets from the dispensing head are dispensed through said tube.

An advantage of these embodiments is that splash onto dispensing head electronics may be eliminated or at least reduced.

In various example embodiments of the present invention said communication path between said transmitter and receiver is transmitted across said tube.

An advantage of this embodiment is that detecting electronics may be provided in a splash free area.

In various example embodiments of the present invention said tray area is configured for supporting at least two racks of collections vessels.

An advantage of these embodiments is that continuous fractionating may be performed by substituting a first rack with filled collection vessel with a rack having empty collection vessels while filling collection vessels in a second rack.

In various example embodiments of the present invention said collection vessels are angled relative to a normal to said first plane.

An advantage of these embodiments is that splash of droplets may further be reduced. Instead of letting the droplets enter the liquid surface in the collection vessels, where splash may be directed out of said collection vessel, said droplets, with the inclined collection vessels will instead be directed towards an inner wall of said collection vessel. Any splash of droplets from an impact of said droplet to said inner wall will be in a direction towards another inner wall area of the collection vessel and thereby keeping the liquid inside the vessel. Droplets hitting an inclined surface will, in itself, further reduce splashing compared to hitting a planar surface perpendicular to a path of droplets.

In various example embodiments of the present invention, said moveably supported carrier and/or said moveably connected dispensing head is/are provided with splash covers configured for prohibiting liquid splash emanating from said at least one collection vessel from entering a linear movement mechanism of the carrier and/or the dispensing head.

An advantage of these embodiments is that splash contamination of the linear movement mechanism is eliminated or at least reduced to a minimum. Another advantage is that said covers also reduce damage to any electrical components hidden inside said covers.

In various example embodiments of the present invention electronics in said dispensing head are provided in a waterproof housing.

An advantage of these embodiments is that liquid damage to electronics is substantially eliminated.

In various example embodiments of the present invention said dispensing head is assembled with a snap fit.

An advantage of these embodiments is that manufacturing of said dispensing head may be kept at a minimum. Another advantage is that the assembly and disassembly of said dispensing head may be performed without any tools. Yet another advantage is that service of said dispensing head is easier than prior art dispensers.

In another aspect of the present invention it is provided a method for operating a fraction collector, said method comprising the steps of:

a. providing a carrier moveably supported by a support system,
b. providing an extension arm connected to the carrier wherein at least one dispensing head for dispensing droplets is moveably connected to the extension arm, said dispensing head and said carrier are configured to move relative to the support system in a first plane,
c. providing a detection device configured for detecting said droplets from said dispensing head,
d. moving the dispensing head in synchronism with the droplets so that droplets from the dispensing head will enter at least one collection vessels provided on a tray area, wherein a motion of the carrier is achieved by a linear bearing Y-slide unit wherein the linear bearing Y-slide unit is arranged underneath a linear bearing Y-rail and wherein the carrier is attached to the linear bearing Y-slide unit.

An advantage of this method is that it is less complex than prior art operating methods of fraction collectors.

In another aspect of the present invention, a cooling means configured to be used in a fraction collector is provided, said cooling means comprising an enclosed cooling volume comprising a cooling media, wherein said cooling volume is configured for at least partially surrounding at least one collection vessel.

One advantage of such cooling means is that use of the fraction collector in a temperature-controlled environment may be eliminated. Such cooling means may be designed to be used in connection with one or a plurality of already existing microtiter plates or may be designed as a cooling microtiter plate, i.e., having both wells for collection vessels and a cooling volume inside said microtiter plate surrounding at least partially said wells for receiving said collection vessels.

In another aspect of the present invention there is provided a rack configured for comprising at least one collection vessel to be used in a fraction collector, said rack comprises cooling means comprising an enclosed cooling volume comprising a cooling media, wherein said cooling volume is configured for at least partially surrounding said at least one collection vessel.

The advantage of these embodiments is that the rack may have integrated or detachable cooling means which will increase the usability of a fraction collector.

In yet another aspect of the present invention there is provided a dispensing head configured to be used in a fraction collector apparatus, said dispensing head comprising a nozzle for delivering droplets, wherein said droplets are dispensed through a tube, which tube is wider than the droplets and is made of a material which is permeable to electromagnetic radiation.

The advantage of these embodiments is that electronics in the dispensing head may be provided in a splash free area.

Further advantages with and features of the invention will be apparent from the following detailed description of preferred embodiments.

BRIEF DESCRIPTION OF THE DRAWINGS

A more complete understanding of the abovementioned and other features and advantages of the present invention will be apparent from the following detailed description of preferred embodiments in conjunction with the appended drawings, wherein.

DETAILED DESCRIPTION OF PREFERRED EMBODIMENTS OF THE INVENTION

In the following description containers, fraction tubes, microtiter tubes or collection vessels are different names of the same thing, i.e., means for collecting a predetermined amount of liquid. Said containers, fraction tubes, microtiter tubes or collection vessels may be cylindrically shaped with parallel walls or conical shaped tubes with non-parallel walls.

Figure 1:
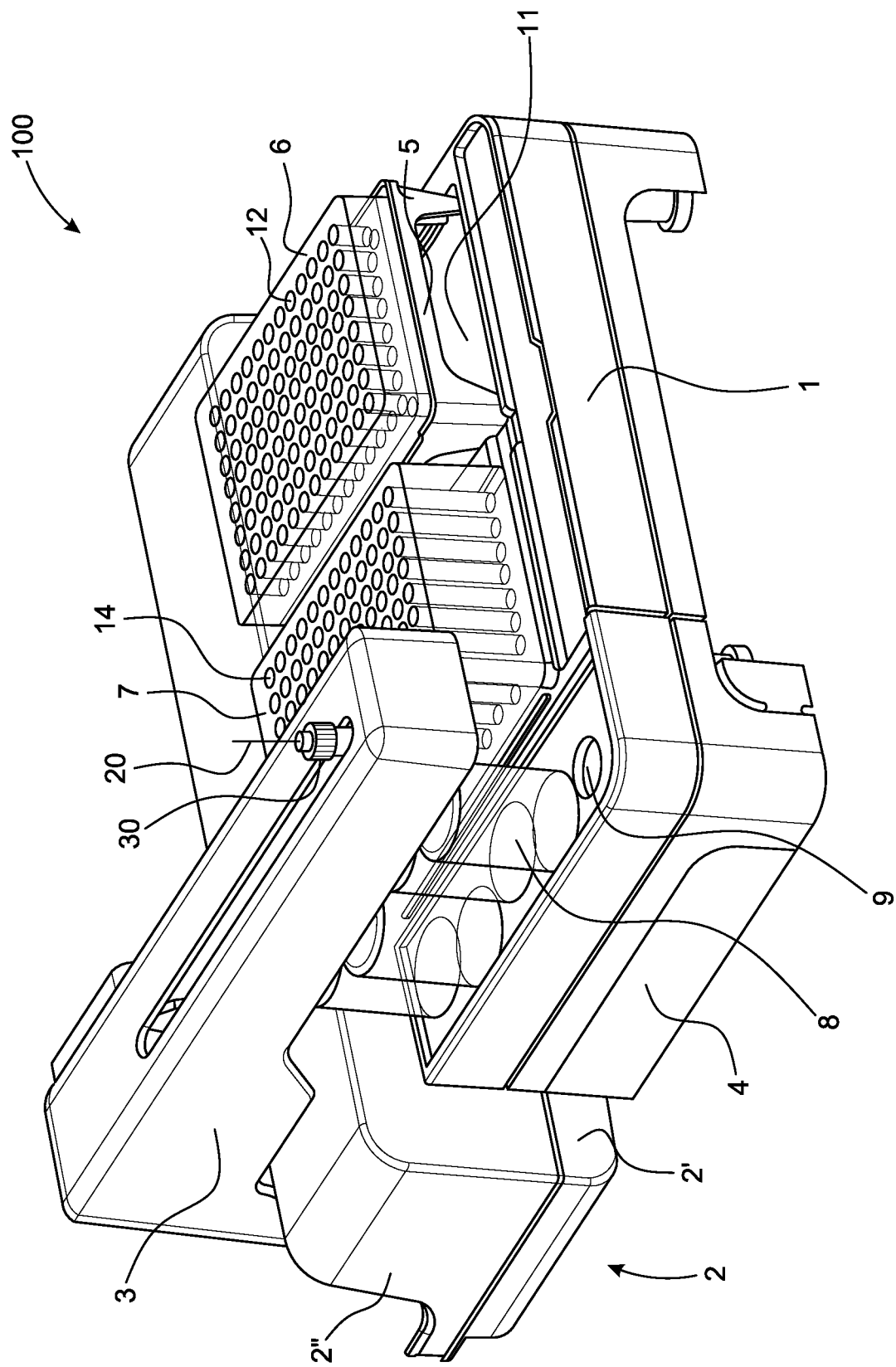
FIG. 1 is a schematic front perspective view of an example embodiment of a fraction collector according to the present invention.

FIG. 1 depicts a schematic front perspective view of an example embodiment of a fraction collector 100 according to the present invention. The fraction collector 100 comprises a support system, an arm 3 and a tube rack 4. Said support system may comprise a bottom frame 1 and a main board housing 2. Said bottom frame 1 may comprise a tray area 11 designed to support at least one rack 6, 7 of collection vessels 12, 14. The design intent is to build a robust, low cost fraction collector 100 with an open architecture that can help prevent flammable liquids from building up in dangerous concentrations. In various example embodiments said support system may be a single unit, two units as disclosed herein or three or more units.

The fraction collector 100 is designed to fit in a tunnel underneath a column chromatography system or on the bench beside a column chromatography system. The column chromatography system may, for instance, be any one of an adsorption chromatography system, ion exchange chromatography system, affinity chromatography system or gel permeation chromatography system.

The fraction collector 100 may have a support system made of cast aluminum or any other suitable rigid material, or combination of materials. The fraction collector 100 may also comprise at least one cover plate, which may be injection molded, 3-D printed or the like.

The fraction collector 100 may have a capacity of two racks or microtiter plates 6, 7. The racks 6, 7 may comprise 24/48/96, or any other suitable number, of wells, each one configured for receiving a collection vessel 12, 14.

Collection vessels 12, 14 of different volumes may require racks 6, 7 of different heights. The use of low racks or microtiter plates 6 may require a distance plate 5 to keep the same level from arm 3 to microtiter plate surface, i.e., same heights from an opening of said collection vessels 12, 14 to the origin of droplets filling the same irrespective of the dimension of the rack 6, 7 itself. In various example embodiments the collection vessels 12, 14 may be Eppendorf Tubes®. In various example embodiments the rack 6, 7 may have at least one integrated collection vessel 12, 14. In various example embodiments the rack 6, 7 may have at least one integrated collection vessel 12, 14 and at least one removably attached collection vessel 12, 14. In various example embodiments the rack 6, 7 may only comprise removably attached collection vessels. The removably attached collections vessels may be of the same volume or at least two different volumes.

The fraction collector 100 may support X and Y movement for scanning a predetermined area with a dispensing head 31 in a serpentine, linear or circular fashion. The serpentine fashion may have a long stroke in X axis and short stroke in Y axis or a short stroke in X axis and a long stroke in Y axis. In the machine as depicted in FIG. 1, the X axis is considered to be the movement of the dispensing head 31 along the arm 3 and the Y movement is the movement of the arm 3 itself. In a linear fashion the collection vessels 12, 14 are always filled starting from one side of the rack 6, 7 and ending at an opposite side of the same rack 6, 7, the starting position may be either from X axis or Y axis, i.e., the long stroke for filling may be in Y direction or X direction respectively and then returning for filling any one of the other rows. The difference between linear fashion X and Y movement of said dispensing head 31 and serpentine fashion X and Y movement of said dispensing head 31 is that the serpentine fashion also fills the collection vessels 12, 14 on the long stroke return movement which is not the case with linear movement. Circular fashion X and Y movement may start at any position along outmost X or Y rows of said rack or microtiter plate 6, 7. The collection vessels 12, 14 are filled along the outmost X and Y rows then continues with the second outmost X and Y rows until a center collection vessel position is reached. Alternatively, the circular fashion works from said center collection vessel position towards the outmost X and Y rows of said rack 6, 7.

Providing at least two racks or microtiter plates 6, 7 on said tray area 11 supports removal of a first non-active rack or microtiter plate 6 while dispensing in the second rack or microtiter plate 7.

A tube rack 4 may be removably attached to at least one side of the bottom frame 1. In FIG. 1 the tube rack 4 is attached to the left side of the bottom frame 1 having 5 tubes 8, 9 along an X axis direction of the machine, i.e., along a stroke of a dispensing head 31. A home position may be above a home tube 9. The home tube may be a 15 ml tube arranged to collect any drops that may be dispensed by the dispensing head 31 when positioned at the home position. A flow through of liquid that does not need to be fractionated may be collected in any one of four flow through tubes 8. Said flow through tubes 8 may be 50 ml tubes. The flow through tubes 8 may be filled during a linear or serpentine movement of said dispensing head 31.

Figure 4:
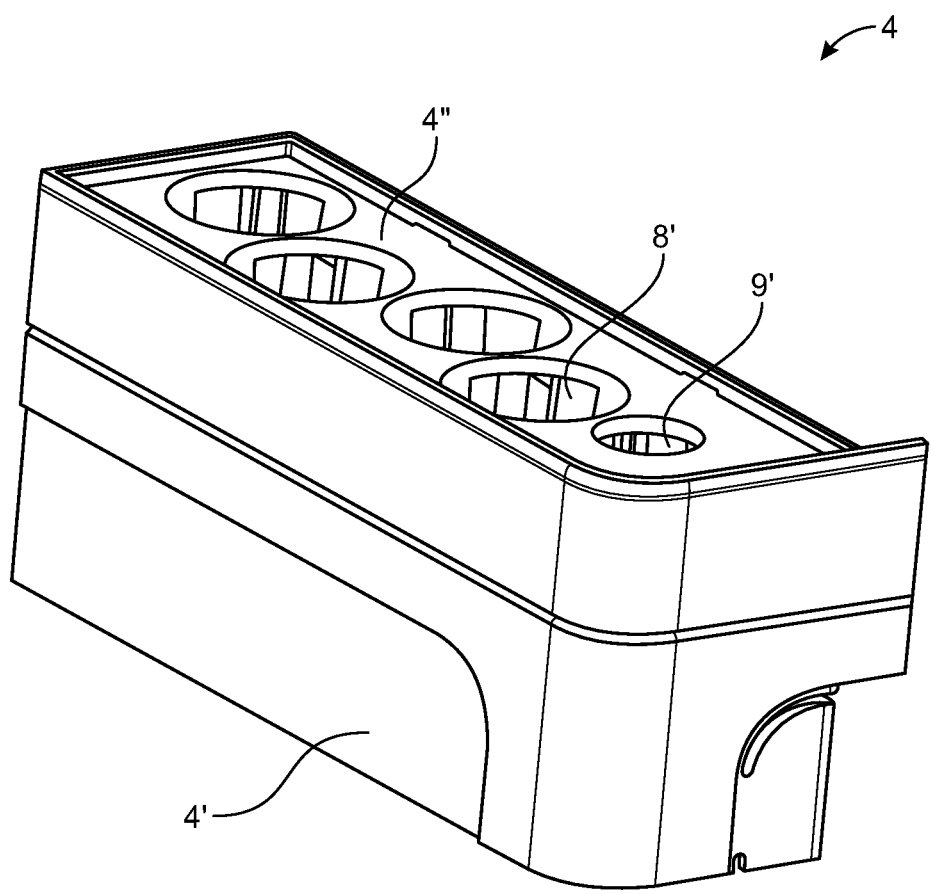
FIG. 4 is a perspective view of an example embodiment of a tube rack.

FIG. 4 depicts a perspective view of an example embodiment of a tube rack 4. The tube rack 4 may be snap fitted to the bottom frame 1. In an alternative embodiment at least two tube racks may be used either on opposite sides of the tray area 11 or on alternative sides of the tray area 11, i.e., along X axis and Y axis. In one embodiment, the tube rack 4 is arranged in between two collection vessel positions 12 and 14 so that it can be reached without having to move above the other vessel whereby a risk of contamination can be avoided.

The tube rack 4 may comprise two pieces, a frame 4' and a top plate 4" comprising four flow through holes 8' for receiving the flow through tubes 8 and one home hole 9' for receiving the home tube 9. The tube rack may be made of PBT which is UL94-V0 classified or any other suitable material.

The tube rack 4 may be attached to the bottom frame 1 using two guiding hooks and a snap-fit with a release button. The tube rack 4 may be washable in a dish washer. The frame may have drain holes to prevent collection of dishwasher water.

Fractionation may be done in one of the collection vessels 12, 14. It is possible to remove a first microtiter plate or rack 6 whilst fractionation is performed in any one of the vessels 14 of said second microtiter plate or rack 7.

The bottom frame 1 may be a die cast aluminium piece with some machined features. All or most of the components of the fraction collector 100 may be assembled to the bottom frame 1 and thus it's important that the tolerances of the bottom frame 1 are high.

Alignment features for positioning the microtiter plates 6, 7 may be machined on the tray area 11 of the bottom frame 1. It may be important that the tolerance of the alignment features is high to allow for high precision positioning of the racks or microtiter plates 6, 7. The alignment features may be machined to fit corresponding alignment features in said microtiter plates 6, 7 according to their standard measurements. There may be markings on said tray area 11 corresponding to different types of microtiter plates which may increase the usability of the fraction collector 100.

In FIG. 1 only a connection portion 30 of a dispensing head 31 is shown, the rest of the dispensing head is hidden by a cover 3' of said arm 3. A flexible tube or capillary 20 may be arranged for attachment of the dispensing head 31 in said fraction collector 100 with an external column chromatography system.

Figure 6:
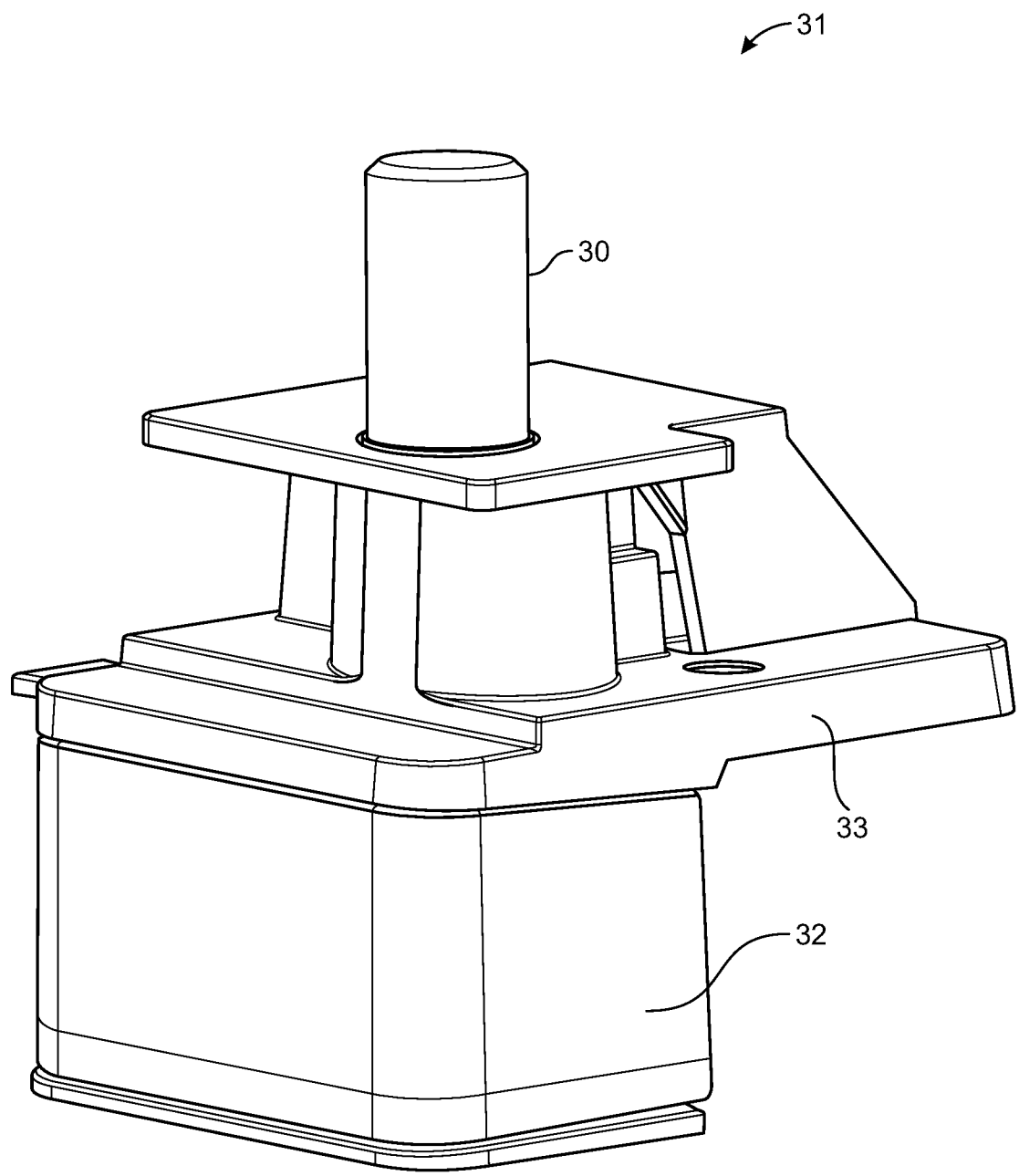
FIG. 6 is a front perspective view of an example embodiment of a dispensing head according to the present invention.
Figure 7:
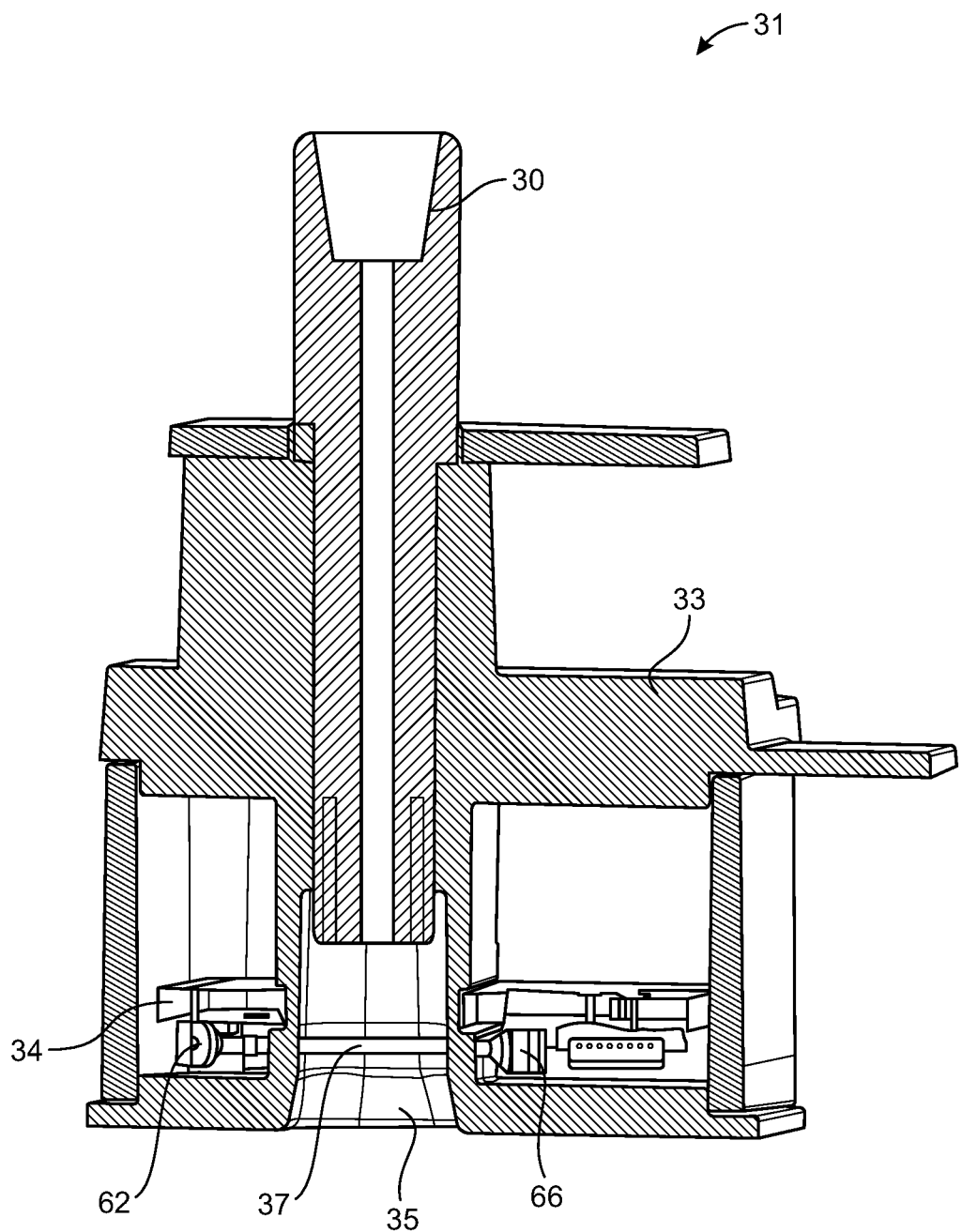
FIG. 7 is a cross sectional side view of the dispensing head in FIG. 6.
Figure 8:
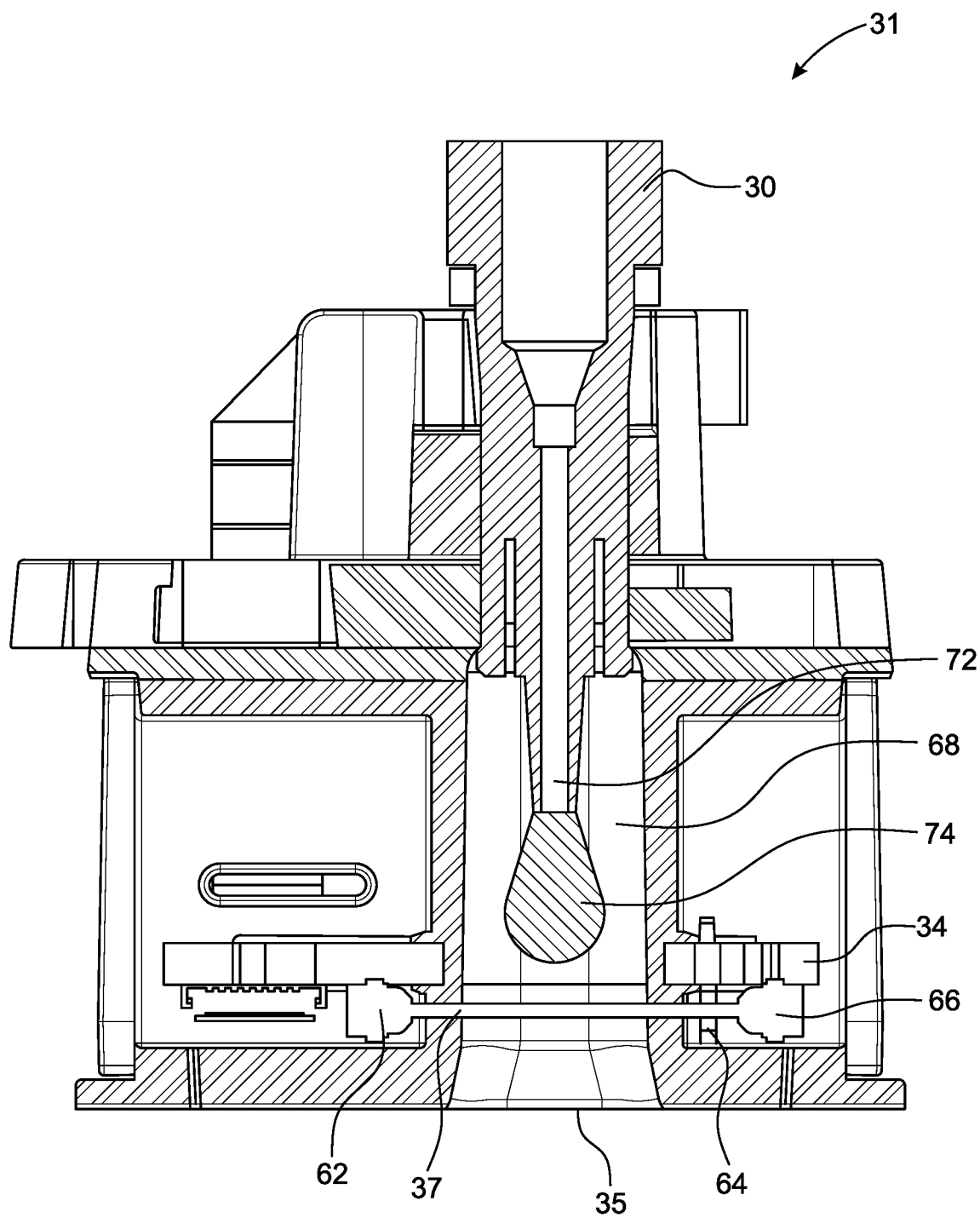
FIG. 8 is an enlarged portion of an example embodiment of a drop sensor mechanism in the dispensing head according to the present invention.

FIGS. 6-8 depict the dispensing head 31 in various views. The dispensing head 31 comprises a housing 33, a cover 32, the connection portion 30 and a support 34 for electronics and/or means for detecting droplets. A nozzle 72 is configured for delivering droplets 74 of liquid from the chromatography system attached to the dispensing head 31.

To resist splash from droplets 74 onto various parts of the dispensing head 31 or any other component of the fraction collector, the droplet 74 may fall within a transparent pipe 68 before leaving the dispensing head 31 through a exit passage 35. The cover 32 has both the function of splash protection for the electrical and mechanical components as well as protection shielding for prohibiting damage to sensitive components inside the cover 32. The cover 32 may be snap fit assembled to the housing 33. At least part of the dispensing head 31 may also be removably attachable to the fraction collector apparatus 100. Such a dispensing head 31 may thus be removable for cleaning and/or replacement during servicing, as necessary.

The dispensing head 31 may also comprise at least one flag fork sensor, or other type of sensor, having the function of detecting home position in an X and/or Y direction. The dispensing head 31 may also comprise a transmitter and receiver for detecting droplets falling from the dispensing head. Detecting droplets may be performed by an electromagnetic radiation source 62 and an electromagnetic radiation sensitive sensor 66 arranged to detect when a drop 74 is released from the nozzle 72 and passes the sensor, i.e., breaking an electromagnetic radiation path 37 between said electromagnetic radiation source 62 and said electromagnetic radiation sensitive sensor 66. An aperture 64 may be arranged in close proximity to the sensor 66 in order to increase the accuracy of the detected electromagnetic radiation from the electromagnetic radiation source 62. In various example embodiments a plurality of apertures 64 may be arranged on a movable plate in front of said sensor 66. Depending on the size of the nozzle, and thereby the size of the droplets, different apertures may chosen, i.e., for small droplets a small aperture may be chosen and for larger droplets a larger aperture is chosen. The electromagnetic radiation source 62 may be any suitable light source such as a white light source, a laser source or an infrared source. The sensor 66 is chosen with respect to the used electromagnetic radiation source. The electromagnetic radiation path 37 between the sensor 66 and the electromagnetic radiation source 62 may pass said transparent pipe 68.

Both support system 1, 2 and arm cover 3' have an open design to avoid potential trapping of vapor from flammable liquids by the fraction collector, since such trapped vapor may represent a safety issue. Surfaces facing the customer/system user may have a smooth and easy to clean design. The open architecture also provides good visibility for the customer to follow/view the fractionation. The instrument is minimized in size to provide a small area and/or volume footprint, and is easy to handle. Various embodiments of the present invention may be provided that have an area footprint of: width w≤320 mm and depth d≤270 mm, optionally with a height h≤190 mm (e.g. h≤170 or 180 mm without various inserts/trays/racks inserted). For example, 150 mm≤w≤320 mm, 120 mm≤d≤270 mm and h≤170 mm. Preferably, various embodiments also have a mass m of less than or equal to 4 kg. For example, 1 kg≤m≤4 kg; 1 kg≤m<4 kg; 1 kg≤m≤3 kg; 2 kg≤m≤4 kg; 2 kg≤m≤3 kg; etc.

The arm 3 may comprise a carrier 42, linear bearing X-rail 50, dispensing head 31, motor electronics (not shown) and arm cover 3'.

The dispensing head 31 comprises a linear bearing X-slide unit at its bottom end. The dispensing head 31 runs on top of linear bearing X-rail 50 connected to motor electronics with a flex cable. The arm cover 3' may have a snap fit to the carrier 42. The arm cover 3' has an open design to avoid potential trapping vapor from flammable liquids by the fraction collector, since such trapped vapor may represent a safety issue. A feature of the arm cover 3' may to cover the motor electronics and to serve as design feature. The movement of the arm 3 may have a zero position for calibration when the arm detects the sensors X and Y. The movement may be only in X or in Y to keep the electric current as low as possible or in X and Y for speeding up positioning. The linear bearing X-rail 50 is attached to the carrier 42.

The carrier 42 comprises a linear bearing Y-slide unit 41. The carrier 42 is attached to an underside of said linear bearing Y-slide unit 41. The linear bearing Y-slide unit 41 moves along a linear bearing Y-rail 40. The underside of said linear bearing Y-slide unit 41 is below said linear bearing Y-rail 40. An attachment of said carrier 42 to said linear bearing Y-slide unit 41 provides for at least a portion of the carrier 42 to be arranged below the linear bearing Y-rail 40, i.e., at least a portion of the carrier 42 is hanging under said linear bearing Y-rail 40 and can therefore be considered as an upside-down/inverted linear bearing motion. A Y-axis motion is achieved by the linear bearing Y-slide unit 41 being arranged underneath the linear bearing Y-rail 40. The carrier 42 is attached to the linear bearing Y-slide unit 41 and is formed to carry the linear bearing X-rail 50 such that it extends above the linear bearing Y-rail 40. The pipe 68 and/or splash covers 3', 32 may protect a linear movement mechanism of the carrier 42 and/or the dispensing head 31, i.e., the Y-rail 40, X-rail 50, linear bearing Y-slide unit 41 and the linear bearing X-slide unit, from liquid splash.

The carrier 42 may be provided with a pin 44 with a bushing that runs in a grove 45 in the bottom frame 1 to distribute load from the arm 3 to the support system and reduce torque on the linear bearing Y-rail 40. This also provides for smoother running without vibration in arm 3. In an alternative embodiment said pin is provided on said linear bearing Y-slide unit 41. The pin 44 and grove 45 components provide for additional support in the direction perpendicular to the Y-axis motion and is designed to decrease a torque load on the Y-axis bearing component. The pin 44 and grove 45 components may be designed to decrease torque in clockwise and/or anti-clockwise directions with respect to the Y-rail 40.

Figure 2:
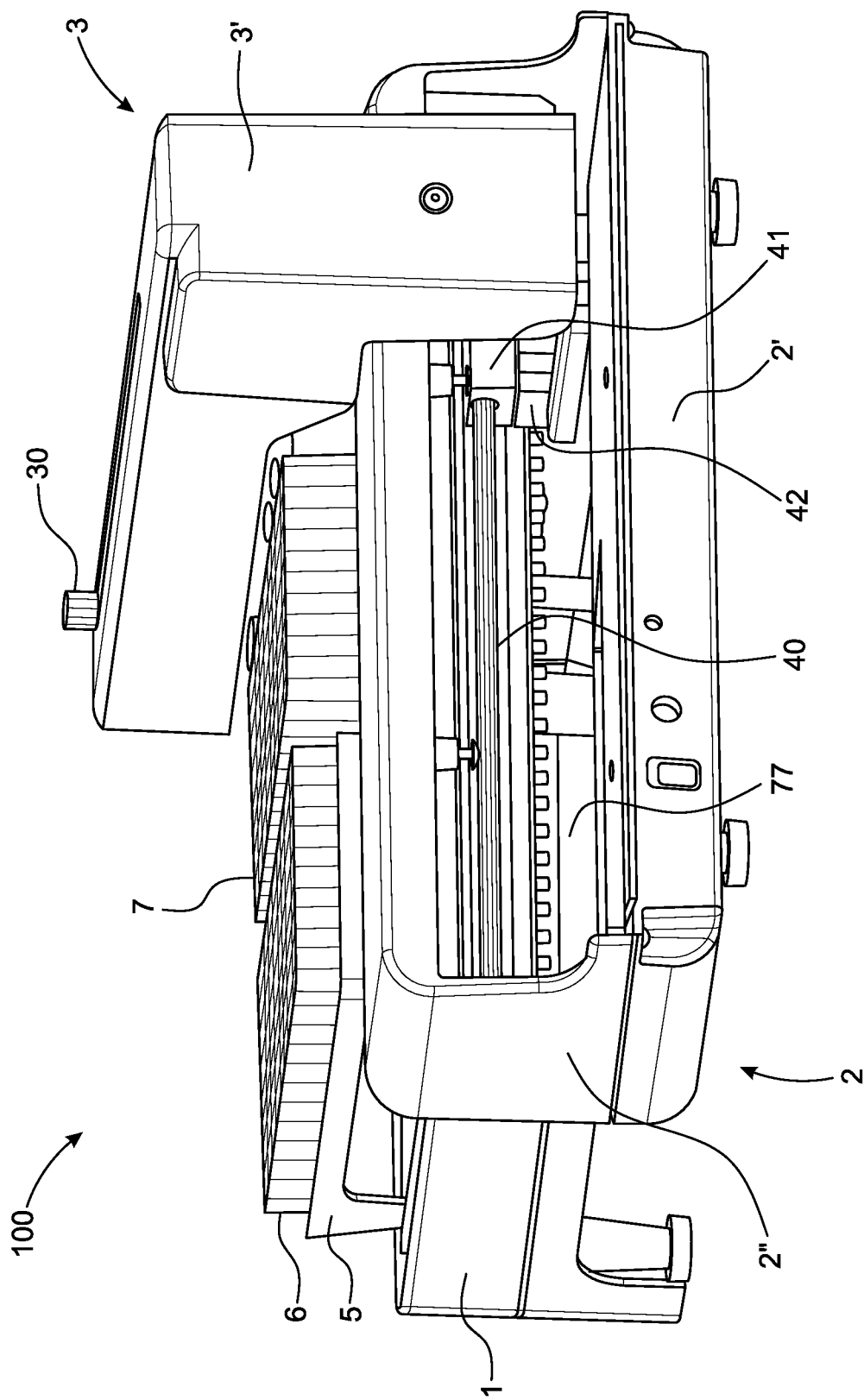
FIG. 2 is a schematic rear perspective view of the same example embodiment of fraction collector as depicted in FIG. 1.
Figure 3:
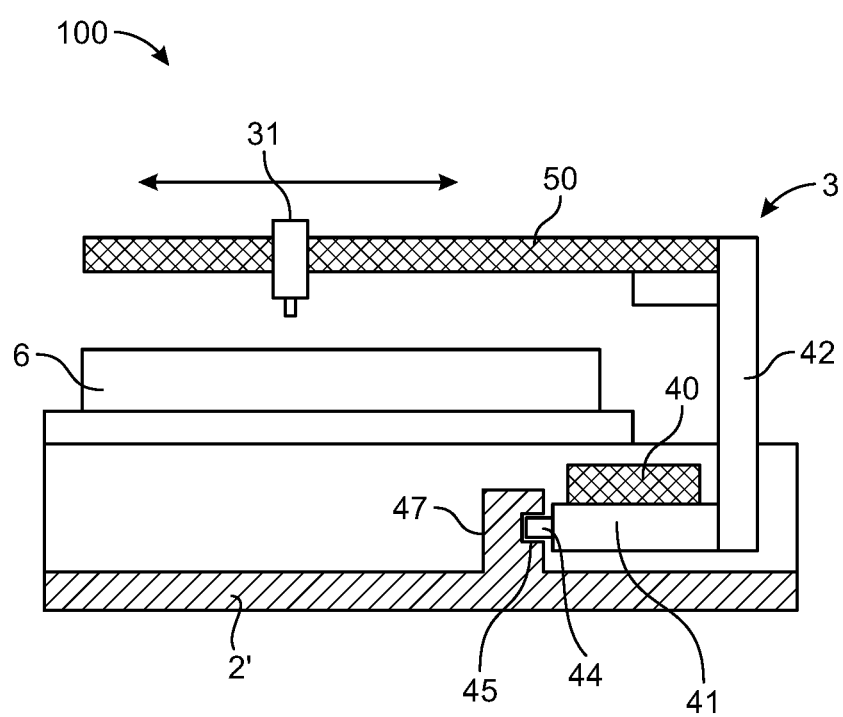
FIG. 3 is a schematic partial cross-sectional side view the same example embodiment of fraction collector as depicted in FIG. 2 without a cover of an arm.

The linear bearing Y-rail 40 is attached to the support system, either at the bottom frame 1 or the main board housing 2. The main board housing 2 is in FIG. 1-3 illustrated to comprise a main board base 2' on top of which there is a main board cover 2". The main board housing has an opening 77 configured for receiving said carrier 42 and allowing said carrier 42 to move freely between its end positions. Said linear bearing Y-rail 40 may be attached to said main board cover 2". Driving means for the X-axis motion and/or the Y-axis motion may be a threaded rod, rack and pinion, belt drive mechanism or the like.

In various example embodiments of the present invention the linear bearing Y-rail 40 for said linear bearing motion of said carrier 42 may be arranged below an opening of said collection vessels 12, 14. In various example embodiments of the present invention the linear bearing Y-rail 40 for said linear bearing motion of said carrier 42 may be arranged below a tray area 11. By providing the linear bearing Y-rail 40 at a low position in said fraction collector a compact design may be achieved. A low position of said linear bearing Y-rail may also efficiently use the bottom frame 1 as a torque reducer for the linear movement by using said pin 44 with a bushing that runs in said grove 45 in the bottom frame 1 to distribute load from the arm 3 to the support system and preventing a torque on the linear bearing Y-rail 40. In an alternative embodiment said grove 45 is arranged in a support structure 47 attached to the main board base 2'.

There may be two fork sensors on the carrier 42 that travel along a ridge with openings for detecting end positions of said carrier.

The carrier 42 is the mechanical link between X and Y linear bearing. It may have an impact on the tolerance chain of the fraction collector 100, especially perpendicularity between the linear bearings X and Y movement. The carrier 42 may be a die cast aluminum part. Features that may have an impact on the tolerance chain may be machined.

The cover 3' protects the electronics in the arm 3 from condensation droplets from the carrier 42 and as a mechanical protection so the customer cannot accidentally reach it.

The linear slide units for X and Y movement may be a modified Stork Drives® ¼" pitch unit. The linear bearing X-rail 50 and linear bearing Y-rail 40 may have the same pitch but different length.

The fraction collector may further be arranged to receive cooled collection vessels in order to keep the fractions cooled. X-Y movement may be synchronized with droplet generation, i.e., the movement may be made when the droplets 74 are not released from the nozzle 72. A beam of electromagnetic radiation 37 between said electromagnetic radiation source 62 and the electromagnetic radiation sensitive sensor 66 intersects with a path of droplets emanating from the nozzle 72. The beam of electromagnetic radiation 37 may also cross a transparent tube 68 in which said droplet 74 is falling. An aperture 64 may be provided in front of said electromagnetic radiation sensitive sensor 66. A droplet released from the nozzle 72 is collected by any one of the collection vessels 12, 14.

X-Y movement of said dispensing head 31 may be synchronized with the droplet formation and droplet release in such a way that movement is performed only when droplets are safely attached to said nozzle 72. The movement of the dispensing head from one collection vessel 12, 14 to another collection vessel 12, 14 may also take into account the flow rate of the liquid through said nozzle. An increased flow rate will increase the droplet formation and a time slot for moving said dispensing head is reduced by increased droplet formation frequency. One also may take into account the acceleration and deceleration of the dispensing head movement in order to predict a safe time slot where movement may be performed without providing droplets outside the desired area, i.e., inside the collection vessel.

In an example embodiment, the movement of the dispensing head 31 may be initiated after a drop 74 has been detected. Movement of the dispensing head 31 may in an example embodiment only be allowed in a time slot during 50% of the time previously registered between two consecutive drops. A control unit may control the movement of the dispensing head. The control unit may be pre-programmed for different types of racks 6,7 being used, i.e., the number of collections vessels, the distance between collections vessels the order said collection vessels should be filled etc. The control unit may also receive information about the drop frequency and the detection of droplets in order to determine when movement of the dispensing head may be performed without risking any liquid outside the collection vessels.

Figure 5:
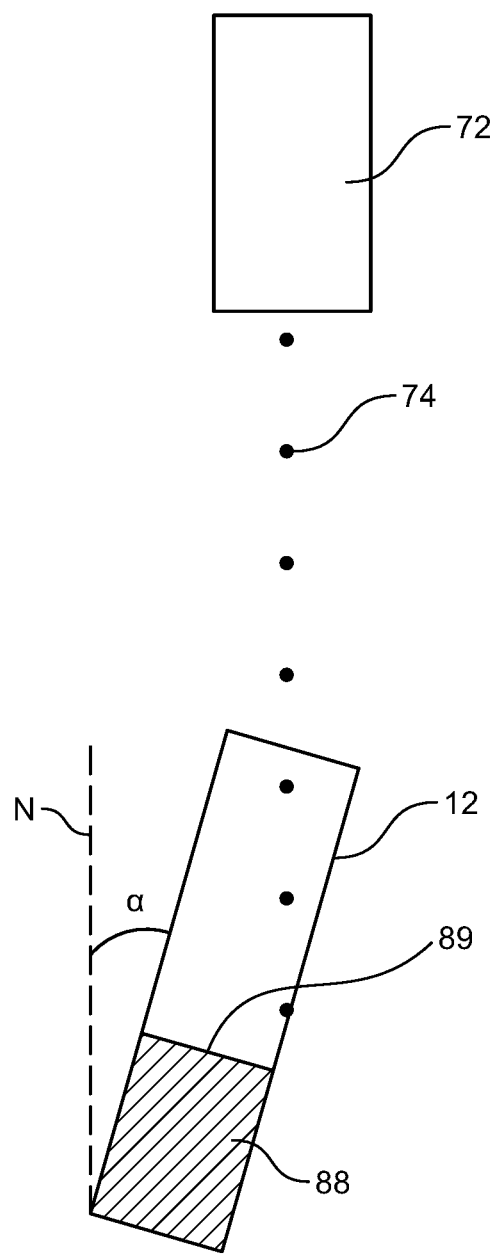
FIG. 5 depicts a side view of a tilted collection vessel.

FIG. 5 depicts a side view of a tilted collection vessel 12, 14. A symmetry axis of the collection vessel 12, 14 may be angled relative to the trail of the droplets 74 from the nozzle 72 or alternatively said collection vessels 12, 14 may be angled with an angle α relative to a normal N to said first plane of movement of said dispensing head 31. Said first plane in which said dispensing head is moved may be a plane essentially in parallel with said tray area 11. The collection vessels may be angled by tilting the rack 6, 7 or by providing wells in said rack which are not perpendicular to a bottom surface of said rack 6, 7. In various example embodiments, the tray area 11 may not be perpendicular to the trail of the droplets from the nozzle 72. When the droplets 74 hits an inner side high up in the collection vessel 12, the droplets 74 have less energy to dispose and the liquid follows the inner side of the collection vessel 12 down to the collected liquid 88. If any small droplets are discharged, they will be directed towards the other inner wall of the collection vessel 12. When the droplets from the nozzle 72 hit the liquid surface 89, small droplets may jump out of the collection vessel due to the energy displacement. This leads to deposits of liquid on the nozzle as well as on the surrounding of the collection vessel 12, 14, and in a worst case also in the neighbouring collection vessels. By using a tilted collection vessel, loss of liquid from the fraction may be reduced, deposits on the nozzle and surroundings may be reduced and the risk of contamination of neighbouring fractions may also be reduced.

A detection mechanism for determining the position of collection vessels 12, 14 can be by means of a reading mechanism on said arm 3 for reading a bar-code provided on rack 6, 7 or other detection signature on said rack 6, 7. Racks 6, 7 may be provided on an aligned position on said tray area 11. With a calibrated machine, x-y movement of the machine may know from reading the code where the vessels are located.

Figure 9:
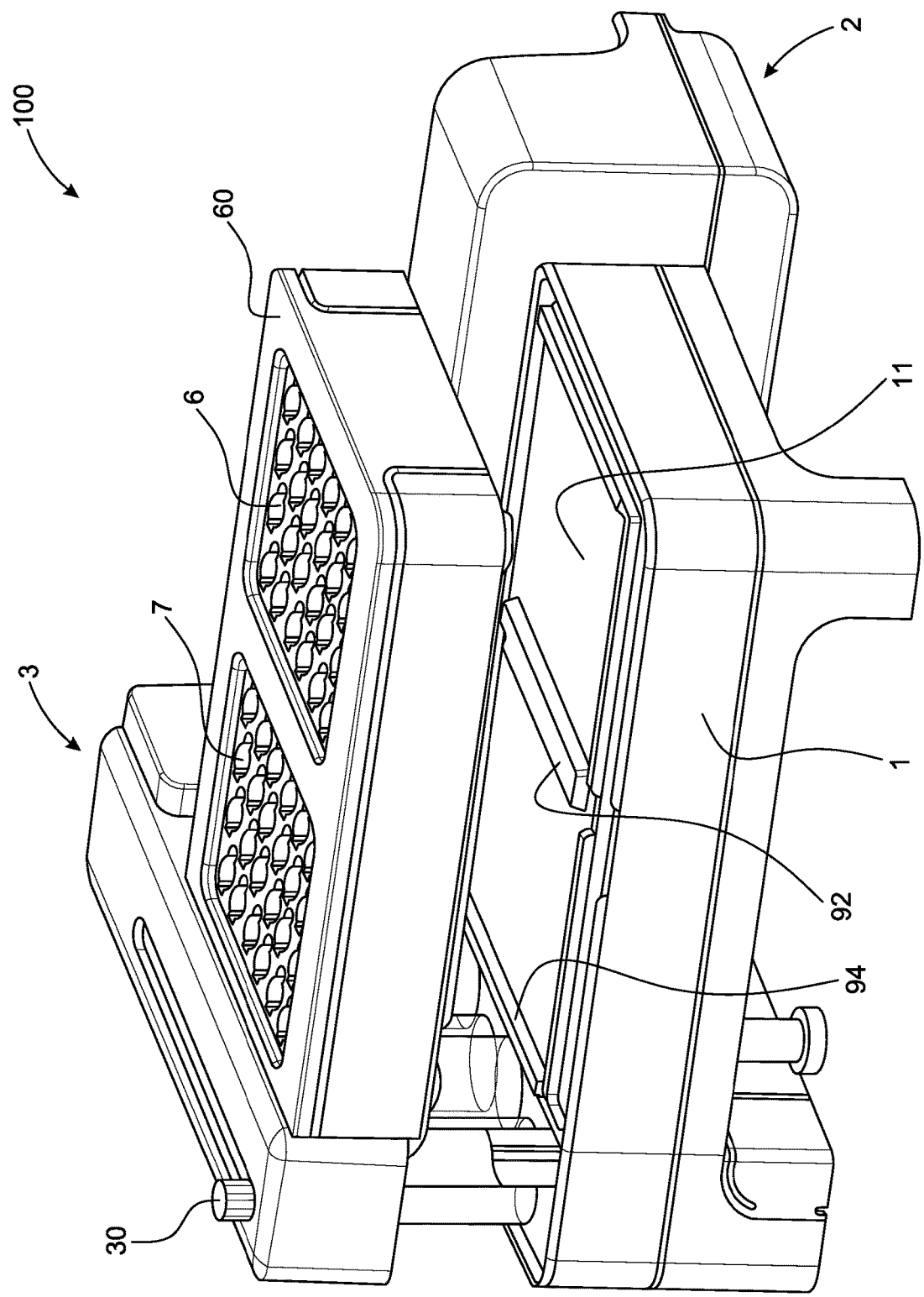
FIG. 9 is a front perspective view of an example embodiment of a fraction collector with cooling means according to the present invention.

FIG. 9 is a front perspective view of an example embodiment of a fraction collector with a cooling means/device according to the present invention. A rack 6, 7 may comprise cooling means 60 comprising an enclosed cooling volume comprising a cooling media. The cooling means 60 are provided at an elevated position in relation to the tray area 11 for illustration purposes only. The cooling means 60 may be configured for at least partially surrounding at least one collection vessel 12, 14. In various example embodiments said cooling means 60 may be removably attached to said rack 6, 7. In various example embodiments said cooling means 60 may be in the form of a hollow frame surrounding the racks 6, 7. The frame may be with or without a bottom plate. The frame may be a single unit for surrounding multiple racks or individual units for surrounding a single rack only. In various example embodiments said cooling means may be an integral part of the rack, i.e., the rack itself is provided with a hollow structure filled at least partially with a cooling media. In FIG. 9 is also illustrated example embodiments of alignment features 92, 94 provided on the tray area 11. Alignment feature 92 is in the form of a protrusion which is configured to be received by a corresponding recess (not shown) in the rack 6, 7. Alignment feature 94 is in the form of protruding elements configured to receive said at least one rack 6, 7 and restrict movement in Y and/or Y direction. Multiple alignment features may be provided on the tray area for receiving different types of racks 6, 7 and/or cooling means 60. The cooling means 60 may be provided in a reduced temperature area, such as a cooler or freezer, before use. A cooled down cooling means may be removed from the reduced temperature area just before use in order to cool down the dispensed liquid in the collection vessels 12, 14.

Various embodiments may also be provided that comprise one or more temperature sensors integrated therein. For example, temperature sensors may be provided in one or more of: the support system, carrier, extension arm, dispensing head, tray area, rack, etc.

Various embodiments may also be provided with cooling elements or systems therein. For example, an air cooling system may be provided to provide cooled air to at least one rack and/or collection vessel. In various embodiments, a cooling block may be provided that is optionally releasably couplable to least one rack and/or collection vessel. Such a cooling block may be fabricated by 3-D printing, for example, and may be filled/fillable with a coolant fluid, such as water. The invention is not limited only to the embodiments described above and shown in the drawings, which primarily have an illustrative and exemplifying purpose. This patent application is intended to cover all adjustments and variants of the preferred embodiments described herein, thus the present invention is defined by the wording of the appended claims and the equivalents thereof. Thus, the equipment may be modified in all kinds of ways within the scope of the appended claims.

Throughout this specification and the claims which follows, unless the context requires otherwise, the word "comprise", and variations such as "comprises" or "comprising", will be understood to imply the inclusion of a stated integer or steps or group of integers or steps but not the exclusion of any other integer or step or group of integers or steps.

The invention claimed is:

1. A fraction collector apparatus comprising:
   a. a support system,
   b. a carrier moveably supported by the support system,
   c. an extension arm connected to the carrier,
   d. at least one dispensing head for dispensing droplets and moveably connected to the extension arm, wherein the dispensing head and carrier are configured to move relative to the support system in a first plane, and
   e. a tray area designed to support at least one rack, wherein the at least one rack is designed to comprise at least one collection vessel, wherein a motion of said carrier is achieved by a linear bearing Y-slide unit, and wherein the linear bearing Y-slide unit is configured to move along a linear bearing Y-rail, and wherein the carrier is attached to an underside of the linear bearing Y-slide unit.

2. The fraction collector apparatus according to claim 1, wherein said linear bearing Y-rail is arranged at a position in Z-direction that is lower than a top surface of said at least one rack arranged on said tray area.

3. The fraction collector apparatus according to claim 1, wherein said rack comprises cooling means comprising an enclosed cooling volume comprising a cooling media, where said cooling means is configured for at least partially surrounding at least one collection vessel.

4. The fraction collector apparatus according to claim 1, wherein said dispensing head comprises a transmitter and a receiver for detecting said droplets, wherein a communication path between said transmitter and receiver crosses a path of said droplets.

5. The fraction collector apparatus according to claim 4, further comprising an aperture in front of said receiver.

6. The fraction collector apparatus according to claim 4, wherein said transmitter is an electromagnetic radiation source and said receiver is an electromagnetic radiation sensitive sensor.

7. The fraction collector apparatus according to claim 1, wherein said dispensing head further comprises a tube, which tube is wider than the droplets and is made of a material which is permeable to electromagnetic radiation, said droplets from the dispensing head being dispensed through said tube.

8. The fraction collector apparatus according to claim 7, wherein said communication path between said transmitter and receiver is transmitted across said tube.

9. The fraction collector apparatus according to claim 7, wherein said tube is formed from a transparent material.

10. The fraction collector apparatus according to claim 1, wherein said tray area is configured for supporting at least two racks of collection vessels.

11. The fraction collector apparatus according to claim 1, wherein said collection vessels are angled relative to a normal to said first plane.

12. The fraction collector apparatus according to claim 1, wherein said moveably supported carrier and/or said moveably connected dispensing head is/are provided with splash covers configured for prohibiting liquid splash emanating from said at least one collection vessel from entering a linear movement mechanism of the carrier and/or the dispensing head.

13. The fraction collector apparatus according to claim 1, wherein electronics in said dispensing head is provided in a water-proof housing.

14. The fraction collector apparatus according to claim 1, wherein said dispensing head is assembled with a snap fit.

15. The fraction collector apparatus according to claim 1, wherein said dispensing head is removably coupled thereto.

16. The fraction collector apparatus according to claim 1, further comprising one or more of: an air cooler, a cooling block and one or more temperature sensor(s).

17. A cooling arrangement configured to be used in a fraction collector apparatus according to claim 1, said cooling arrangement comprising an enclosed cooling volume comprising a cooling media, wherein said cooling volume is configured for at least partially surrounding at least one collection vessel.

18. The cooling arrangement according to claim 17, wherein said cooling arrangement is removably attached to said rack.

19. A rack configured for comprising at least one collection vessel to be used in a fraction collector apparatus according to claim 1, said rack comprises a cooling arrangement comprising an enclosed cooling volume comprising a cooling media, wherein said cooling volume is configured for at least partially surrounding said at least one collection vessel.

* * * * *